(12) United States Patent
Dechu et al.

(10) Patent No.: US 11,176,590 B2
(45) Date of Patent: Nov. 16, 2021

(54) PRODUCT USAGE IDENTIFICATION AND RECOMMENDATION PROVISION

(71) Applicant: International Business Machines Corporation, Armonk, NY (US)

(72) Inventors: Sampath Dechu, Hyderabad (IN); Mohit Jain, Dhanbad (IN); Amrita Saha, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 16/284,737

(22) Filed: Feb. 25, 2019

(65) Prior Publication Data
US 2020/0273080 A1    Aug. 27, 2020

(51) Int. Cl.
G06Q 30/06    (2012.01)
(52) U.S. Cl.
CPC ..... G06Q 30/0631 (2013.01); G06Q 30/0641 (2013.01)
(58) Field of Classification Search
CPC . G06Q 30/0601–0645; G06Q 30/0631; G06Q 30/41; G06Q 50/01
USPC ............................... 705/26.1–27.2
See application file for complete search history.

(56) References Cited

U.S. PATENT DOCUMENTS

| | | | | |
|---|---|---|---|---|
| 8,504,440 B1 * | 8/2013 | Kolawa | ............. | G06Q 30/00 705/26.7 |
| 9,183,460 B2 | 11/2015 | Zhang et al. | | |
| 9,710,829 B1 * | 7/2017 | Sitapara | ............. | G06Q 30/0276 |
| 2007/0168357 A1 | 7/2007 | Mo | | |
| 2013/0346172 A1 | 12/2013 | Wu | | |
| 2014/0032362 A1 * | 1/2014 | Frayman | ............. | G06Q 30/0633 705/26.8 |
| 2014/0279068 A1 | 9/2014 | Systrom et al. | | |
| 2014/0351002 A1 * | 11/2014 | Pessis | ............. | G06Q 30/0201 705/7.29 |
| 2015/0088692 A1 * | 3/2015 | Fung | ............. | G06Q 30/0633 705/26.61 |

(Continued)

OTHER PUBLICATIONS

Grinberg, Nir. "Computational Methods in the Study of Individuals' Attention Online." Order No. 10278764 Cornell University, 2017. Ann Arbor: ProQuest. Web. Apr. 7, 2021. (Year: 2017).*

*Primary Examiner* — Resha Desai
*Assistant Examiner* — Kennedy Gibson-Wynn
(74) *Attorney, Agent, or Firm* — Ference & Associates LLC

(57) ABSTRACT

One embodiment provides a method, including: detecting, on a social media application, a media object comprising at least one image of a final product made from at least one purchased raw product; extracting, from the media object and text corresponding to the social media application post, (i) information related to the final product and (ii) social feedback regarding the final product; determining, based upon the social feedback, that the use of the at least one purchased raw product into the final product comprises positive social feedback; and providing a recommendation regarding the use of the at least one purchased raw product to one or more other individuals, wherein the recommendation is generated using the information related to the final product.

16 Claims, 2 Drawing Sheets

(56) References Cited

U.S. PATENT DOCUMENTS

| | | | | |
|---|---|---|---|---|
| 2015/0178681 A1* | 6/2015 | Agarwal | ............... | G06Q 10/06 |
| | | | | 705/26.8 |
| 2016/0171588 A1* | 6/2016 | Linden | ................ | G06F 3/0488 |
| | | | | 705/26.7 |
| 2016/0188596 A1* | 6/2016 | Keggi | ................ | G06F 17/3053 |
| 2017/0188741 A1* | 7/2017 | Thomas | ............... | A47J 27/002 |
| 2017/0221125 A1 | 8/2017 | Leong et al. | | |
| 2017/0308589 A1* | 10/2017 | Liu | .................. | G06F 17/30554 |
| 2019/0251616 A1* | 8/2019 | Yankovich | ......... | G06Q 30/0202 |

\* cited by examiner

PRODUCT USAGE IDENTIFICATION AND RECOMMENDATION PROVISION

BACKGROUND

Individuals frequently upload a variety of different types of media objects (e.g., photos, videos, a combination thereof, etc.) associated with items that they have purchased and thereafter altered or re-purposed onto various social media platforms. For instance, many individuals buy raw products that they use as components of a greater product or for a purpose different than the originally intended purpose of the raw product. As an example, many individuals buy popsicle sticks in bulk in order to create a variety of different type of objects (e.g., bird feeders, house or vehicle structures, other structures or objects, etc.). Other individuals that see the social media upload may leave comments expressing their enthusiasm over the usage of the raw product.

BRIEF SUMMARY

In summary, one aspect of the invention provides a method, comprising: detecting, on a social media application, a media object comprising at least one image of a final product made from at least one purchased raw product; extracting, from the media object and text corresponding to the social media application post, (i) information related to the final product and (ii) social feedback regarding the final product; determining, based upon the social feedback, that the use of the at least one purchased raw product into the final product comprises positive social feedback; and providing a recommendation regarding the use of the at least one purchased raw product to one or more other individuals, wherein the recommendation is generated using the information related to the final product.

Another aspect of the invention provides an apparatus, comprising: at least one processor; and a computer readable storage medium having computer readable program code embodied therewith and executable by the at least one processor, the computer readable program code comprising: computer readable program code that detects, on a social media application, a media object comprising at least one image of a final product made from at least one purchased raw product; computer readable program code that extracts, from the media object and text corresponding to the social media application post, (i) information related to the final product and (ii) social feedback regarding the final product; computer readable program code that determines, based upon the social feedback, that the use of the at least one purchased raw product into the final product comprises positive social feedback; and computer readable program code that provides a recommendation regarding the use of the at least one purchased raw product to one or more other individuals, wherein the recommendation is generated using the information related to the final product.

An additional aspect of the invention provides a computer program product, comprising: a computer readable storage medium having computer readable program code embodied therewith and executable by the at least one processor, the computer readable program code comprising: computer readable program code that detects, on a social media application, a media object comprising at least one image of a final product made from at least one purchased raw product; computer readable program code that extracts, from the media object and text corresponding to the social media application post, (i) information related to the final product and (ii) social feedback regarding the final product; computer readable program code that determines, based upon the social feedback, that the use of the at least one purchased raw product into the final product comprises positive social feedback; and computer readable program code that provides a recommendation regarding the use of the at least one purchased raw product to one or more other individuals, wherein the recommendation is generated using the information related to the final product.

A further aspect of the invention provides a method, comprising: accessing purchase history of a user, the purchase history comprising information associated with the purchase of at least one raw product; detecting, on a social media application of the user, an image comprising a usage of the at least one raw product to form another product, the usage being associated with an alteration of the at least one raw product; determining that a predetermined number of positive user interactions on the social media application are associated with the usage in the image; and providing at least one recommendation associated with the usage to at least one of: a seller of the at least one raw product and a user offering a positive comment.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
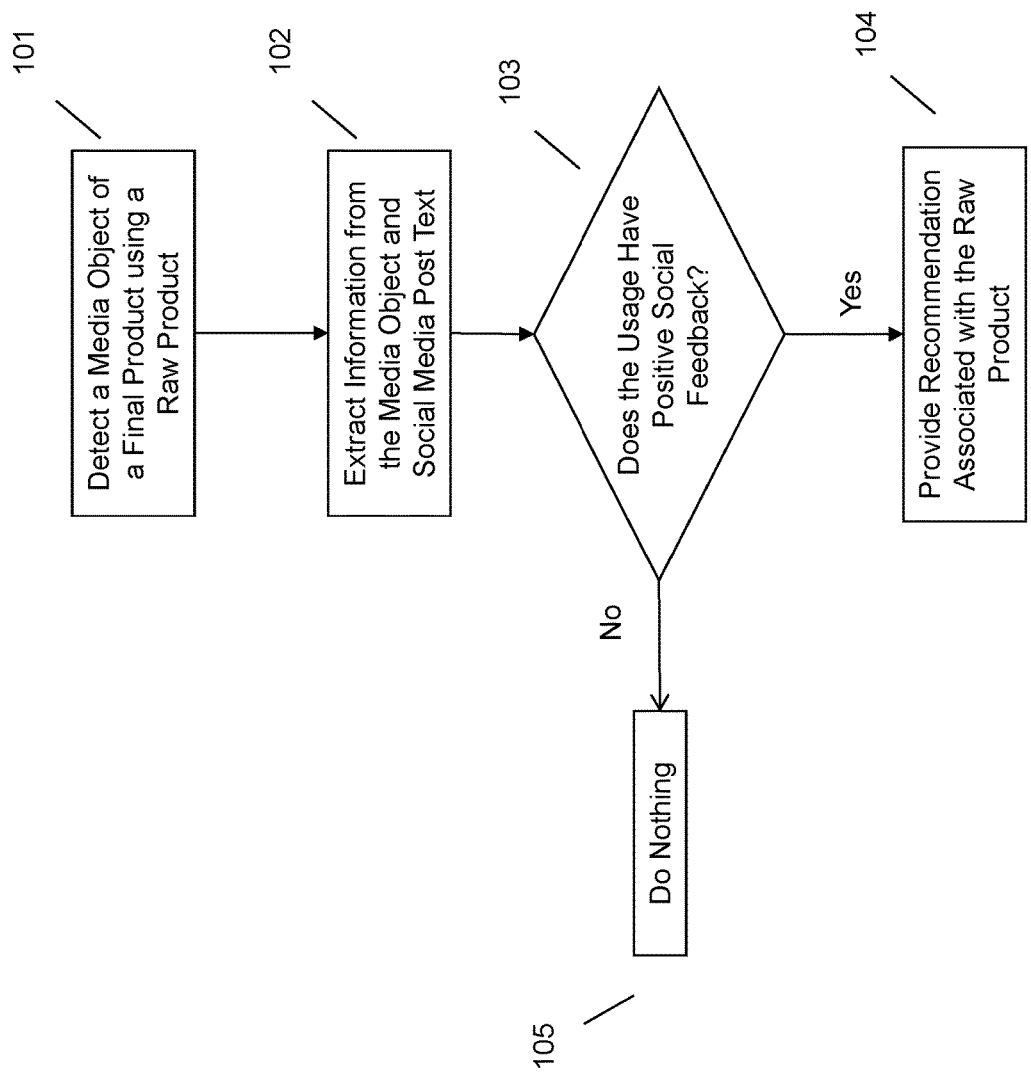
FIG. 1 illustrates a method of identifying a use of a raw product in the formulation of another product and thereafter providing a recommendation associated with the usage to one or more other individuals or entities.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, most if not all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

Individuals sometimes purchase a variety of different raw products that they change or alter to create a different, final product. For example, an individual constructing an art piece may purchase multiple raw products that may be necessary to complete the final piece. Oftentimes, the originally intended purpose of the raw products may not have been thought to be associated with the final product. For example, a business owner may sell fruit to customers in a fruit crate (i.e., a large wooden box). Some individuals may repurpose the fruit crate and use it for a different purpose than for holding fruit (e.g., the fruit crate may be painted or altered in some way so as to be used as a furniture item, etc.).

Subsequent to the completion of the final product, many individuals will upload and share an image or video of that product on a social media page or application. When on this page, the uploaded media may be available for the public to view and comment on. Oftentimes, members of the public that really enjoy the final product will indicate their appreciation of it through positive comments and/or actuation of a "like" or "share" button. These individuals may desire to replicate the final product themselves and may want to know the combination of raw products that have gone into the creation of the final product and/or how these raw products were used/altered to create the final product. Additionally, manufacturers or sellers of the raw product may want to know if certain raw products are frequently used in the construction or creation of other products. This information may be helpful so that they can gear their marketing toward relevant and interested audiences.

Conventional methods of product recommendation are largely based on the purchase history of one or more customers. For example, a conventional method may conclude that a customer who purchased product A may also be interested in product B, where product B is a similar item to product A or is a logical accessory of product A. However, these conventional methods do not consider that the customer may intend to use product A in the construction of a final product that may be substantially unrelated to the raw product. More particularly, as an example, a customer purchasing popsicle sticks to construct an artistic structure may not want recommendations for other types of popsicle sticks, but rather, may be interested in receiving a recommendation for some type of adhesive material (e.g., glue, etc.) to hold the popsicle sticks together or a recommendation for paint to alter the visual appearance of the popsicle stick structure. Additionally, because these conventional methods are largely based upon a user's previous purchases, they may not be capable of identifying a user's interest in an object that the user has not purchased. Furthermore, conventional methods also may not be able to identify a raw product a user may be interested in because the conventional methods are focused on the final product.

Accordingly, embodiments of the underlying application provide a system and method for providing information associated with the usages of raw products in the formation of final products to interested users and raw product sellers. The system may analyze a media object (e.g., a static image or a video uploaded to a social media page, etc.) to determine an identity of at least one raw product in the media object. The system may also identify a usage of the at least one raw product in the media object. For example, a system may be able to identify how a raw product has been changed and/or manipulated to form another product. The system may then determine whether the usage of the raw product in the media object comprises positive social feedback and, responsive to determining that it does, the system may provide output associated with the usage to one or more individuals. For example, information regarding the raw products used to create the final product may be sent to the viewers who comment favorably. As another example, indications that certain raw products may be used for purposes other than those originally intended may be sent to the sellers of these raw products. Such a system and method may be able to identify objects of interest that conventional methods may not and may also provide more relevant information associated with consumer interest.

In a non-limiting example use-case of the foregoing system, an individual may purchase a wooden fruit crate that may conventionally be used for delivering and/or storing fruit. After purchase, the individual may paint and/or alter the fruit crate so that it may be used for one or more different purposes. For instance, an individual may purchase a plurality of tan-colored, wooden fruit crates and paint them all a darker, mahogany color. The individual may then flip each fruit crate on its side and stack and secure the fruit crates on top of one other in order to create a bookshelf. Once such a project is complete, the individual may post an image or video of their final product on a social media site. Other individuals may see that post and leave comments expressing their enthusiasm over the usage of the fruit crates (e.g., "Awesome bookshelf!", "Really cool use of the fruit crates!", etc.). A system may analyze these comments to determine a variety of different pieces of information. For instance, an embodiment may be able to identify individuals interested in obtaining a fruit crate by identifying the individuals that provided positive comments regarding the usage of the fruit crates. A system may then dynamically provide fruit-crate based advertising to those identified individuals. As another example, a system may inform the retailers of fruit crates that the fruit crates may be used for more than just traditional purposes.

The foregoing system provides a technical improvement over current product recommendation systems by providing recommendations through the identification of positive social media indications. Such a system differs from conventional systems by being more in-tune with the social atmosphere rather than solely being tied to a user's purchase and/or viewing history. In other words, rather than being associated with a particular purchase history or website viewing history, the recommendation system is dynamic and not tied to a specific retail space. The recommendation system can monitor and analyze a social media posting to identify raw products utilized in the posting to create a final product and thereafter provide information associated with the usage of these raw products to one or more interested parties. Thus, the described system and method provides a recommendation mechanism that is focused on the raw products and their usage rather than simply the final product itself, which is the primary focus of many conventional product recommendation methods and systems.

FIG. 1 illustrates a method of identifying a usage of a raw product in the formulation of another product and thereafter providing output associated with the usage to one or more other individuals or entities. At 101, the system may detect a media object comprising a usage of at least one raw product. In the context of this application, a "raw product" may refer to virtually any product that may be altered, changed, or repurposed to create another type of product. A non-limiting example of a raw product may include a craft object, e.g., a popsicle stick, cotton ball, small wooden shape, and the like. Another non-limiting example of a raw product may include a vehicle, the components of which may be altered or switched out to form another type of vehicle (e.g., the rims or tires of a vehicle may be changed to give the vehicle a new style profile, etc.). Furthermore, in the context of this application, the "usage" of one or more raw products may refer to the ways in which the one or more raw products are manipulated or altered to form a new product.

In the system, the detection of the media object (e.g., an image, a video, a combination thereof, and the like) may be specified by a user. For example, a user may provide command input to the system to detect all media objects comprising a particular raw product of interest to the user. Subsequent to the receipt of this command, the system may analyze (e.g., using one or more conventional image and/or video analysis techniques, etc.) one or more accessible media objects available to the system to determine whether the media objects comprise the relevant raw product. The media objects analyzed by the system may be resident on various social media platforms or applications. Responsive to detecting one or more media objects that comprise the raw product of interest to the user, the system may further analyze the media object to identify a usage of the raw product. More particularly, the system may identify the raw product and may then further identify the changes or additions imparted on the raw product to form a final product. For example, a system may initially identify that a media object comprises a fruit crate as the raw product. The system may thereafter identify that the fruit crate was painted a certain color and/or may identify other objects that were attached to the fruit crate and/or may identify portions of the original fruit crate that were removed or altered.

As an alternative to the foregoing, in the system, the detection of the media object need not be specified by a user. Rather, the system may analyze each uploaded media object by a user to identify any raw products and their usage. Alternatively, the system may access a customer purchase history and thereafter attempt to detect any media object comprising any of the raw products in the customer purchase history. The system may perform this detection and analysis once (e.g., when the media object is uploaded, after the media object has been uploaded for a predetermined amount of time, etc.) or multiple times (e.g., at predetermined time intervals, etc.).

At 102, the system may extract information related to the final product and social feedback regarding the final product from the media object and corresponding social media application post. For example, the system may extract metadata from the media object. As another example, the system may use natural language processing techniques to extract information from text within a post corresponding to the final product. In an additional example, the system may extract information related to a number of "likes" or positive feedback related to the social media application post. Information that may be extracted may include the use of the final product, what alterations were made to the purchased raw product to create the final product, other products that were used in the creation of the final product, the location of the final product, the occasion or season that may be associated with the final product (e.g., event decorations, summer decorations, wedding decorations, dormitory organization techniques, etc.), any product specific comments, sentiments of the comments corresponding to the social media post, characteristics of the users providing positive comments or feedback, and the like. Analysis of this information may provide insight into the type of customer who may be most likely to use the final product or may be a good target demographic for advertisement of the purchase of the raw product to create the final product.

At 103, the system may determine whether the usage of the at least one raw product comprises positive social feedback. In the system, the determination may first involve the identification of whether the media object comprises a predetermined number of positive indications. Positive indications may be one or more of user-provided appreciation indicators (e.g., a "like", a "retweet", a "share", etc.) and positive user comments. The identification of whether a user comment associated with the media object is positive may be determined using one or more conventional text analysis techniques. For example, the system may analyze the comments for specific key words and/or phrases and identify how those words or phrases are used with respect to the raw product. Furthermore, the system may utilize the analysis of the comments to confirm that the commenting individuals were expressing enthusiasm toward the usage of the raw product as opposed to some other feature of the social media posting. In the system, each of the user-provided appreciation indicators and positive user comments may count as a single positive indicator.

The system may determine that positive social feedback exists for the usage in the media object by utilizing one or more of the subsequent methods. For instance, the system may identify that a predetermined number of positive indicators have been received (e.g., the system may identify that an image comprises over 100 "likes", etc.). Additionally or alternatively, as another example, the system may identify that over 10 comments associated with the use of the raw product in the media object were positive in nature. Additionally or alternatively, in yet a further example, the system may identify that a predetermined number of positive indicators were received within a predetermined amount of time (e.g., the predetermined number of positive indicators was received within 30 minutes, 1 hour, etc.). Additionally or alternatively, in yet a further example still, the system may identify that the social media post was liked/shared by or positively commented on by one or more influential individuals. In the context of this application, an influential individual may be an individual who is considered to be a celebrity and/or may be an individual who has a large friend or follower list.

Responsive to determining, at 103, that the usage does not comprise positive social feedback, the system may conclude that the usage of the raw products in the media object was not of interest to many individuals of the public and may, at 105, do nothing. Conversely, responsive to determining, at 103, that the usage does comprise positive social feedback, the system may provide, at 104, a recommendation or other output associated with the usage of the raw product to one or more individuals.

At 104, the system may provide the recommendation or other output to a positive-indicator providing user, a seller of the raw product, another individual or entity, and the like. In the system, the output may be associated with an advertisement to purchase the raw product. For example, the system may identify each positive-indicator providing user and transmit an advertisement to them related to the identity of the raw product and where they may be able to buy it. Additionally and/or alternatively, the system may provide the positive-indicator-providing user with information associated with the usage of the raw product to form the final product (e.g., an explanation regarding how the raw product was manipulated, what other products were used, the cost to create the final product, etc.). As another example, the system may, upon identifying that a customer has purchased the raw product, provide a recommendation to the customer of the final product as a use of the raw product.

In the system, the output may be associated with a recommendation to alter an advertising feature associated with the one or more raw products. The system of the foregoing may identify one or more retailers or sellers of the raw product and provide suggestions to them on how to adjust marketing materials to capture a greater consumer base. As an example, the system may provide a recommendation to the seller of the raw product to advertise the final product as a usage of the raw product. For example, the system may be available to a product seller who has access to a customer purchase history as well as their social media uploads. The system may track the social media uploads of the customer to mine for usage/alterations trending for a given product. This information may be returned to the product seller so that the product seller may know a currently popular use for that raw product. Additionally or alternatively, the system may provide one or more suggestions on how the product seller may adjust their advertising, packaging, and/or marketing materials in order to capture the attention of other consumers interested in utilizing the raw product in a way similar to the original customer.

In the system, the output may comprise various statistics that may be stored and/or transmitted to product sellers in order to improve their business models. For instance, the system may provide the product sellers with information associated with the usage of the one or more raw products. More particularly, the system of the foregoing may identify the types of final products that may have been created from the raw products. For example, the system may identify that a fruit crate was frequently used to create shelves, coffee tables, and store fruits. Additionally or alternatively, the system may identify the common locations in which the raw products were utilized. For example, for a can of a particular type of paint, the system may identify that the most common usages of that paint were used in the living room and the bedroom. Additionally or alternatively, the system may identify the season in which certain raw products were purchased and/or identify the final products constructed from the raw products in a particular season. For example, the system may identify that glass jars were frequently purchased in the spring and/or summer to construct centerpieces whereas cotton balls were frequently purchased in the fall and/or winter to construct costumes or holiday-related structures.

In addition to the foregoing, the system may provide an objective identification of the number of individuals that created each type of final product. For example, the system may identify that 150 individuals used the fruit crate to create a shelf, 70 individuals used the fruit crate to create a coffee table, and 25 individuals used the fruit crate to store fruits. From this information, the system may identify that a popular trend at the moment is to create shelf-like furniture from fruit crates. Additionally, the system may utilize this information to direct targeting advertising dependent on the products that each individual created. For instance, using the foregoing example, the system may advertise shelf-associated items to the 150 individuals who utilized the fruit crate to create a shelf and advertise coffee table-associated items to the 70 individuals who utilized the fruit crate to create a coffee table. The system may also keep track of characteristics of the users (e.g., age, geographic location, time of year of comment, etc.) who provided positive feedback to identify a target set of users for advertisement of the raw product.

In addition to the foregoing, the system may provide output associated with the most frequent alteration type to the raw product and which other raw products were frequently utilized together with the raw product to form a final product. For example, the system may identify that popsicle sticks in combination with brown paint and a flower vase were commonly used to construct a particular shelf-type wall ornament.

Thus, the described systems and methods represent a technical improvement over current product recommendation systems by providing a system that may analyze the social media uploads comprising raw products and thereafter identify popular ways in which those raw products were used and/or altered to form a different product. This information may thereafter be communicated back to a seller of the raw product so that the seller may be apprised of a potentially new and non-intuitive market for the raw product. Additionally, this information may also be communicated to another individual that may be interested in engaging in a similar activity. Such a product recommendation mechanism may therefore be more in-tune with the popular usage of certain items than conventional product recommendation systems that may only base their product recommendations on like-items purchased or viewed by a user.

Figure 2:
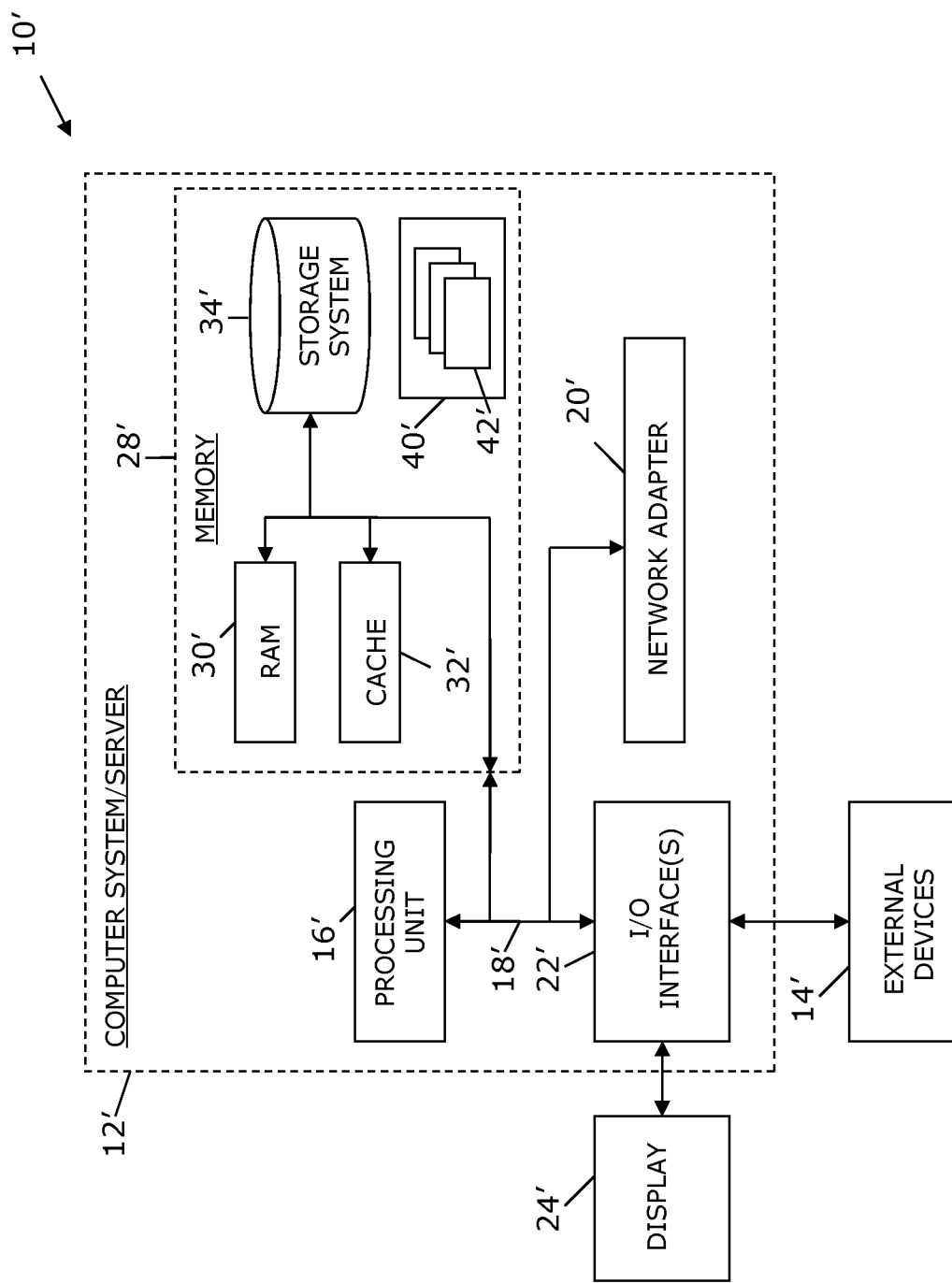
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, performed by one or more processors, comprising:
    detecting, on a social media application, a media object comprising at least one image of a final product made from at least one purchased raw product;
    extracting metadata, from the media object, and text corresponding to a social media application post, by using natural language processing techniques to obtain (i) information related to the final product and (ii) social feedback regarding the final product, wherein the extracting the information related to the final product comprises identifying, by analyzing the media object, the usage of the at least one purchased raw products, wherein the extracting comprises identifying a type of customer for the final product by analyzing the information related to the final product and the social feedback regarding the final product;
    determining, based upon the social feedback, that the use of the at least one purchased raw product into the final product comprises positive social feedback, wherein the determining comprises identifying the media object comprises a predetermined number of positive indications; and
    providing a recommendation regarding the use of the at least one purchased raw product to one or more other individuals, wherein the recommendation is generated using the information related to the final product, wherein the providing the recommendation comprises providing the recommendation to one or more positive-indicator providing individuals, wherein the providing comprises providing a recommendation of the final product to a new purchaser of the at least one purchased raw product, wherein the new purchaser comprises a user receiving a targeted advertisement of the at least one purchased raw product and identified as the type of customer for the final product.

2. The method of claim 1, wherein the final product comprises at least one of: an alteration to the at least one purchased raw product and an addition to the at least one purchased raw product.

3. The method of claim 1, wherein the media object comprises at least one of: a static image and a dynamic video.

4. The method of claim 1, wherein the positive indications comprise at least one of: user-provided likes and positive user comments.

5. The method of claim 1, wherein the providing comprises providing a recommendation to a seller of the raw product to advertise the final product as a use of the at least one purchased raw product.

6. The method of claim 1, wherein the information related to the final product comprises at least one of: a location of the final product, alterations made to the at least one purchased raw product to create the final product, other products used in the final product, and use of the final product.

7. The method of claim 1, wherein the determining comprises identifying characteristics of one or more users who provided positive social feedback.

8. The method of claim 7, wherein the providing comprises providing a recommendation to a seller of the at least one purchased raw product of a target set of users based upon the characteristics.

9. An apparatus, comprising:
at least one processor; and
a computer readable storage medium having computer readable program code embodied therewith and executable by the at least one processor, the computer readable program code comprising:
computer readable program code that detects, on a social media application, a media object comprising at least one image of a final product made from at least one purchased raw product;
computer readable program code that extracts metadata, from the media object and text corresponding to a social media application post, by using natural language processing techniques to obtain (i) information related to the final product and (ii) social feedback regarding the final product, wherein the extracting the information related to the final product comprises identifying, by analyzing the media object, the usage of the at least one purchased raw products, wherein the extracting comprises identifying a type of customer for the final product by analyzing the information related to the final product and the social feedback regarding the final product;
computer readable program code that determines, based upon the social feedback, that the use of the at least one purchased raw product into the final product comprises positive social feedback, wherein the determining comprises identifying the media object comprises a predetermined number of positive indications; and
computer readable program code that provides a recommendation regarding the use of the at least one purchased raw product to one or more other individuals, wherein the recommendation is generated using the information related to the final product, wherein the providing the recommendation comprises providing the recommendation to one or more positive-indicator providing individuals, wherein the providing comprises providing a recommendation of the final product to a new purchaser of the at least one purchased raw product, wherein the new purchaser comprises a user receiving a targeted advertisement of the at least one purchased raw product and identified as the type of customer for the final product.

10. A computer program product, comprising:
a computer readable storage medium having computer readable program code embodied therewith and executable by the at least one processor, the computer readable program code comprising:
computer readable program code that detects, on a social media application, a media object comprising at least one image of a final product made from at least one purchased raw product;
computer readable program code that extracts metadata, from the media object and text corresponding to a social media application post, by using natural language processing techniques to obtain (i) information related to the final product and (ii) social feedback regarding the final product, wherein the extracting the information related to the final product comprises identifying, by analyzing the media object, the usage of the at least one purchased raw products, wherein the extracting comprises identifying a type of customer for the final product by analyzing the information related to the final product and the social feedback regarding the final product;
computer readable program code that determines, based upon the social feedback, that the use of the at least one purchased raw product into the final product comprises positive social feedback, wherein the determining comprises identifying the media object comprises a predetermined number of positive indications; and
computer readable program code that provides a recommendation regarding the use of the at least one purchased raw product to one or more other individuals, wherein the recommendation is generated using the information related to the final product, wherein the providing the recommendation comprises providing the recommendation to one or more positive-indicator providing individuals, wherein the providing comprises providing a recommendation of the final product to a new purchaser of the at least one purchased raw product, wherein the new purchaser comprises a user receiving a targeted advertisement of the at least one purchased raw product and identified as the type of customer for the final product.

11. The computer program product of claim 10, wherein the final product comprises at least one of: an alteration to the at least one purchased raw product and an addition to the at least one purchased raw product.

12. The computer program product of claim 1, wherein the providing comprises providing a recommendation to a seller of the raw product to advertise the final product as a use of the at least one purchased raw product.

13. The computer program product of claim 10, wherein the information related to the final product comprises at least one of: a location of the final product, alterations made to the at least one purchased raw product to create the final product, other products used in the final product, and use of the final product.

14. The computer program product of claim 10, wherein the determining comprises identifying characteristics of one or more users who provided positive social feedback.

15. The computer program product of claim 14, wherein the providing comprises providing a recommendation to a seller of the at least one purchased raw product of a target set of users based upon the characteristics.

16. A method, performed by one or more processors, comprising:
accessing purchase history of a user, the purchase history comprising information associated with the purchase of at least one raw product;
detecting, on a social media application of the user, an image comprising a usage of the at least one raw product to form another product, the usage being associated with an alteration of the at least one raw product, wherein the detecting comprises extracting metadata and using natural language processing techniques to obtain information related to the another product by identifying, by analyzing the media object, the usage of the at least one raw product, wherein the analyzing comprises identifying a type of customer for the final product by analyzing information related to the another product and social feedback regarding the another product;
determining a predetermined number of positive user interactions on the social media application are associated with the usage in the image; and
providing at least one recommendation associated with the usage to at least one of: a seller of the at least one raw product and a user offering a positive comment on the another product, wherein the providing comprises providing a recommendation of the another product to a new purchaser of the at least one raw product, wherein the new purchaser comprises a user receiving a targeted advertisement of the at least one raw product and identified as the type of customer for the another product.

\* \* \* \* \*